United States Patent [19]

Upton

[11] 3,958,826

[45] May 25, 1976

[54] WINDSHIELD FOR GOLF CARTS

[75] Inventor: Frank E. Upton, Wichita, Kans.

[73] Assignee: Federated Merchandisers, Inc., Wichita, Kans.

[22] Filed: May 13, 1974

[21] Appl. No.: 469,428

[52] U.S. Cl. .......................... 296/78 R; 280/DIG. 5; 296/143
[51] Int. Cl.² .......................................... B62J 17/00
[58] Field of Search ............... 296/89, 78, 141, 140, 296/143; 280/DIG. 5; 160/23 R, 23 C, 290 R, 290 F; 248/273, 224, 225

[56] References Cited
UNITED STATES PATENTS

| 436,900 | 9/1890 | Morrison | 296/143 |
|---|---|---|---|
| 595,228 | 12/1897 | West | 296/143 |
| 925,524 | 6/1909 | Steinmetz | 248/224 |
| 1,448,016 | 3/1923 | Welshausen | 160/23 R |
| 2,580,776 | 1/1952 | Herman | 160/23 R |
| 2,890,853 | 6/1959 | D'Azzo | 248/273 |
| 3,101,775 | 8/1963 | Antich | 160/23 R |
| 3,346,227 | 10/1967 | Hankin | 248/224 |
| 3,671,000 | 6/1972 | Williams | 248/225 X |
| 3,709,553 | 1/1973 | Churchill et al. | 280/DIG. 5 X |
| 3,829,152 | 8/1974 | Hobbs | 296/78 R |

Primary Examiner—Robert J. Spar
Assistant Examiner—Donald W. Underwood
Attorney, Agent, or Firm—John H. Widdowson

[57] ABSTRACT

A windshield has a housing and a bracket to mount the housing in transverse relation on a vehicle. A roller in the housing has a transparent sheet rollably mounted thereon. An edge portion of the transparent sheet of material is securable to a lower portion of the vehicle in extended position.

6 Claims, 6 Drawing Figures

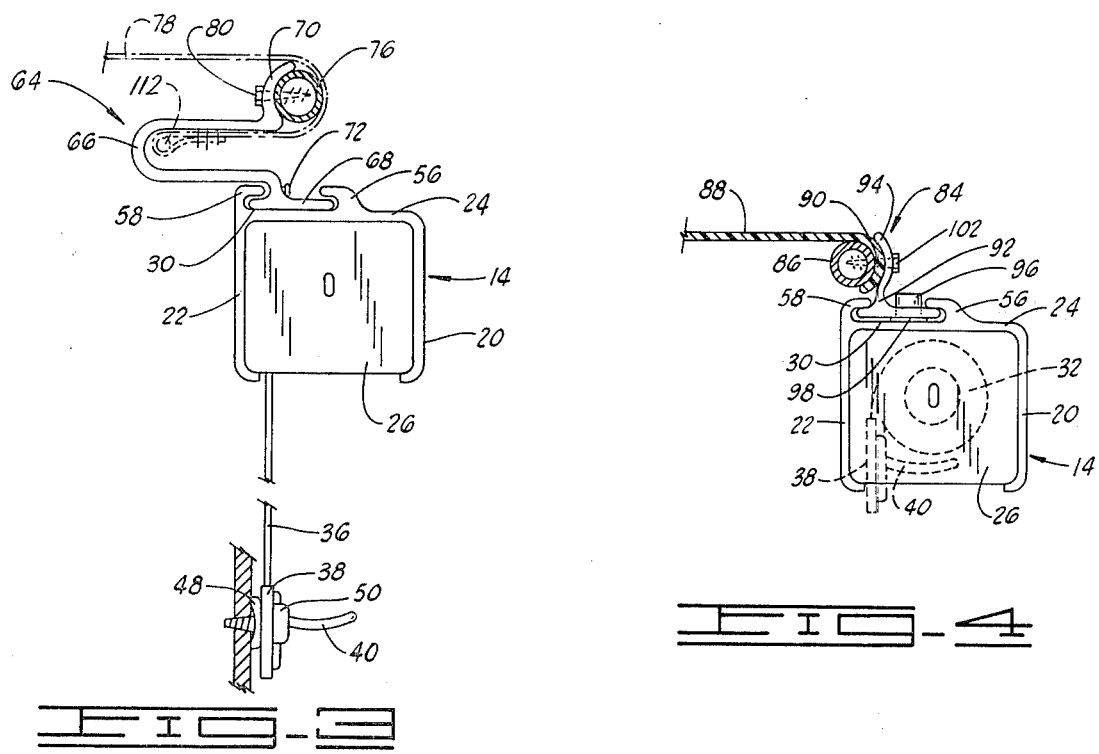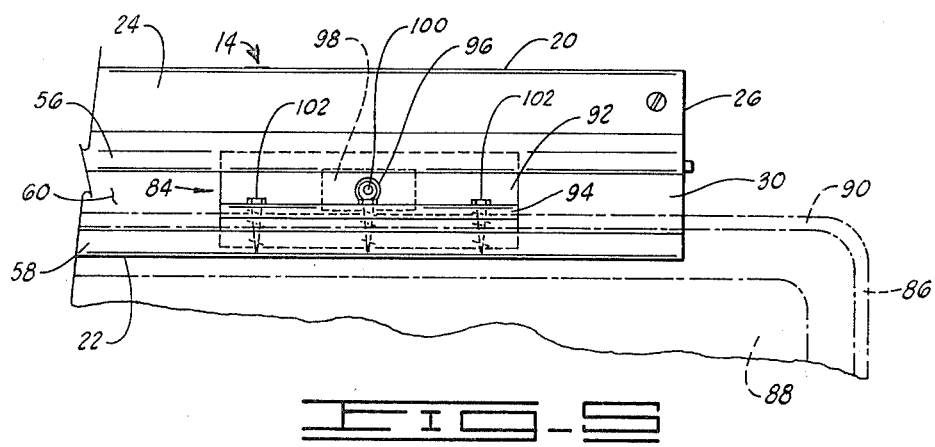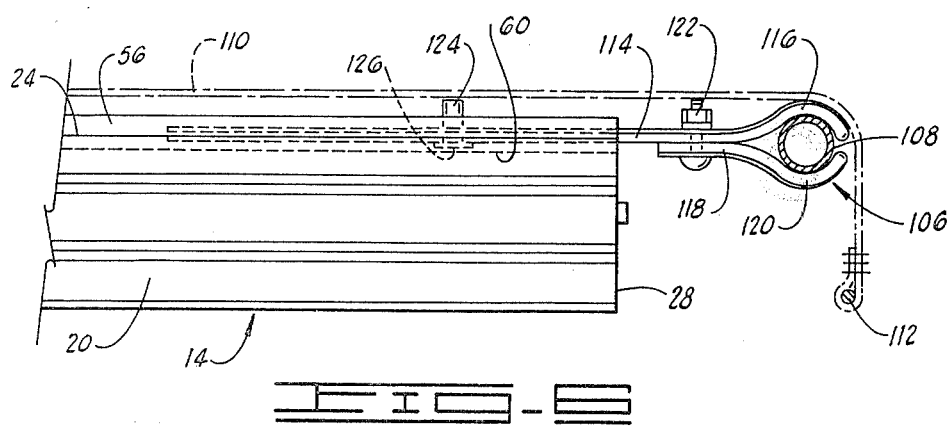

WINDSHIELD FOR GOLF CARTS

BACKGROUND OF THE INVENTION

The invention is related to temporary windshields for vehicles, particularly golf carts, wherein the windshields are extendable for use and retractable for storage. Numerous types of weather shields and vehicle side curtains are known in the prior art which are mountable on an upper portion of a vehicle, such as the top structure, and unrollable or unfoldable to an extended position with a lower edge securable to a lower portion of the vehicle. The prior art devices are constructed primarily as weather shields for opened vehicles having only a permanent top and windshield. For vehicles such as golf carts, which only have a top or sunroof or sun shade, the use of these vehicles is limited to times of fair weather since no protection is for the passengers and for no windshield is provided to deflect wind, rain, blowing sand and the like. Since no protection except from the roof is provided on golf carts and similar vehicles, this limits the use of the vehicle to times of good weather and makes it uncomfortable to use the vehicle during times of bad weather, such as rain or other times such as when dust or sand is blowing as the passengers of the vehicle are subjected to more intense exposure when the vehicle is moving. No prior art device is known to provide a temporary windshield for such vehicle.

SUMMARY OF THE INVENTION

In a preferred specific embodiment, a windshield structure for golf carts includes a housing with mounts to support the housing in a transverse position on a forward upper portion of the vehicle, such as a golf cart. A roller mounted in the housing has a sheet of flexible transparent material rolled thereon to be unrolled for use as the windshield. The lower edge portion of the transparent sheet of material is removably securable to a lower portion of the vehicle. The sheet of flexible transparent material is stored on the roller in the housing until needed at which time it is unrolled from the roller and lower edge portion of the sheet is attached to the vehicle. The roller is a constant tension roller to hold the windshield taut in place.

One object of this invention is to provide a windshield structure overcoming the aforementioned disadvantages of the prior art devices.

Still, one other object of this invention is to provide a windshield for vehicles, such as golf carts, which is storable on a housing mountable on supporting structure of an upper portion of the vehicle and extendable for use with a lower edge portion of the windshield attachable to the vehicle.

Still, one other object of this invention is to provide a windshield for golf carts which can be mounted with the structure of the top or sun roof of a golf cart and pulled down for use with the lower portion of the windshield being attachable to the vehicle.

Yet, another object of this invention is to provide a windshield for golf carts which has a sheet of flexible transparent material supported on the roller and mounted in a housing wherein the housing is attachable by brackets to the top structure of a golf cart or the like and the brackets are removably securable with the housing for substitution with other brackets for mounting the housing for styles and constructions of tops or supporting structures.

Various other objects, advantages and features of the invention will become apparent to those skilled in the art from the following discussion, taken in conjunction with the accompanying drawings, in which:

DESCRIPTION OF THE DRAWINGS

FIG. 3 is an end elevation view of the windshield structure and top structure, shown in FIG. 2;

FIG. 4 is an end elevation view of the windshield shown with the transparent sheet in retracted rolled position and the housing shown attached to a supported structure by the generally T-shaped bracket;

FIG. 5 is a top plan view of the structure shown in FIG. 4 with portions of the supporting structure and bracket shown in dashed and dotted lines for clarity; and FIG. 6 is a front elevation view of the windshield housing attached to a supporting structure, the housing having the end mounting bracket with the pair of semi-annular end portions shaped bracket.

Figure 1:
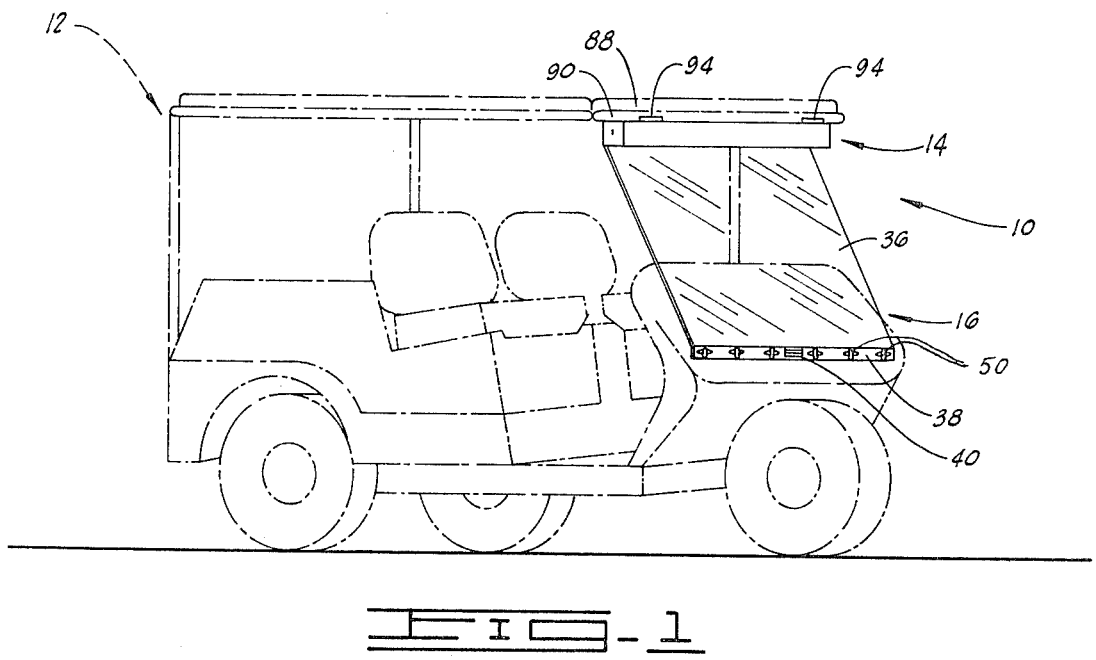
FIG. 1 is a perspective view of a golf cart taken from the front with the golf cart having the windshield housing mounted on the top structure and the sheet of flexible transparent material attached to the cart in use position.

The following is a discussion and description of preferred specific embodiments of the windshield for golf cart structures of this invention, such being made with reference to the drawings, whereupon the same reference numerals are used to indicate the same or similar parts and/or structures. It is to be understood that this discussion and description is not to unduly limit the scope of the invention.

DESCRIPTION OF PREFERRED EMBODIMENTS

Referring to the drawings in detail and in particular to FIG. 1, a windshield structure of this invention, indicated at 10, is shown mounted on the top structure of a golf cart 12. The windshield 10 includes a housing 14 mountable on the structure of the top of a golf cart or the like, and the sheet of transparent flexible material supported on a roller in the housing and detachable to the golf cart on a lower forward portion thereof. The housing 14 is attached to the top or roof structure of the golf cart 12 by brackets. Three different bracket structures are disclosed herein for attaching the housing 14 with different forms of top structures.

Figure 2:
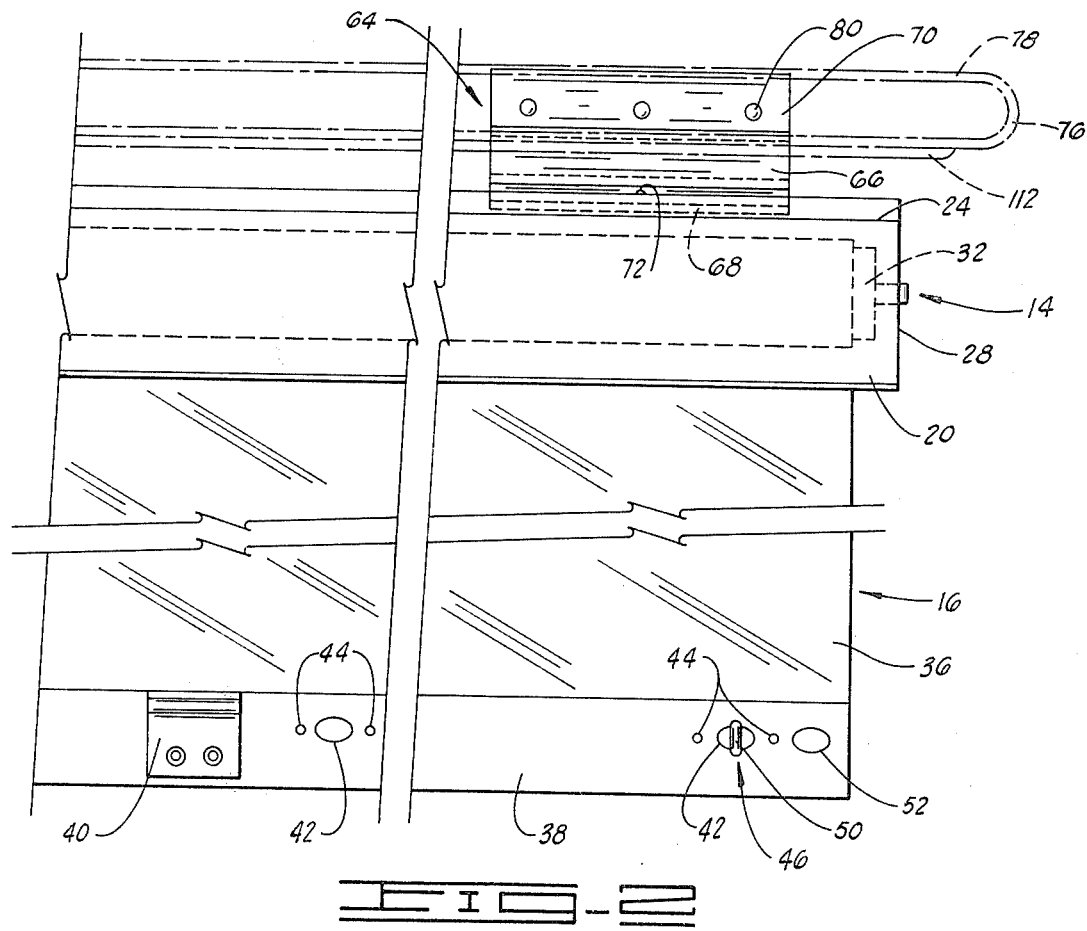
FIG. 2 is a shortened front elevation view of one end portion of the windshield housing and mounted in position on a portion of a golf cart top, the housing having U-shaped bracket, one fastener being shown in locked position on the windshields lower edge portion and the roller as shown in dashed lines.

The housing 14 is shown in mounted position on a golf cart in FIG. 1, shown from an end in FIGS. 3 and 4 and shown from the top at FIG. 5 and shown from the forward side thereof of FIGS. 2 and 6. The housing 14 is an elongated box-like structure, having forward and rear side 20 and 22 and a top portion 24 with ends 26 and 28 defining a cavity thereon and having an opening on its bottom or normally lower portion. Preferably, the sides 20, 22, and the housing top portion 24 are inwardly formed in an extruded member of the top 24 having a slotted portion 30. The slotted portion 30 of the housings top, 24, preferably extends the length of the housing in this forward cross-section as shown in FIG. 3 and 4 for use in mounting in the brackets for mounting the housing 14. Housing end member 26 and 28 are secured to opposite ends of the housing and are preferably separate plate members attached by suitable fasteners such as rivets or bolts. A constant tension roller 32, is mounted in the cavity of the housing with the ends of the roller being attached to the housing end members 26 and 28 as shown, for retractably mounting the sheet of transparent material 16. The roller 32, supports and rolls the sheet of transparent flexible material 16, and it is a spring therein to maintain a substantially constant tension on the sheet of material when it is pulled from the roll as shown in FIGS. 2 and 3.

The sheet of flexible transparent material 16, has the transparent portion thereof specifically indicated at 36 and it is provided with a lower edge portion 38 used for attaching such to the vehicle. Preferably, the flexible transparent sheet of material is a transparent vinyl material. More particularly, the flexible sheet of transparent material is preferably a sheet of transparent vinyl material tinted to reduce glare. The lower edge portion 38 is a perforated member preferably of a plastic or vinyl material secured to the vinyl transparent sheet, 36, by heat bonding. The lower edge portion, 38, is provided with a handle, 40, for pulling the sheet from the roll from the housing and for preventing the sheet's edge portion from entering the house. When the transparent sheet 36 is wound on the roller 32, the handle 40 rests against the interior portions of the housing somewhat as is shown in FIG. 4. The edge portion 38 is provided with a plurality of spaced oblonged apertures 42 with adjacent and smaller apertures 44 as shown in FIG. 2. The apertures 42 are used to attach the windshield's lower end portion 38 to the vehicle by fasteners 46. The fasteners are preferably the twist-top like used in the art for attaching coverings of the like and include a base or mount portion 48 attachable to supporting structures with a rotatable portion 50, secured to the mount to in use be disposed with the opposite side of a sheet of material from the mount and rotated to hold the sheet of material in place against the mount and supporting structure. The large apertures 42 receive and pass the rotatable portion 50, of the fastener 46 so that it can be rotated to the locked position as shown in FIG. 2. The smaller apertures 44 are provided to be used as a guide for positioning the fastener 46. Specifically, the smaller apertures 44 align with apertures in the fastener mount 48 so that when installing the windshield 10 with this invention, holes may be drilled through the aperture 44 and the apertures in the mount 48 for proper positioning of bolts or screws to attach the fasteners 46. An additional elongated aperture 52 is provided at the extreme ends of the perforated lower end portion 38 for attaching the extreme ends of the windshields lower edge portion 38 as is required in some installations.

The slot portion 30 of the housing's top portion 24, has a flat surface 60 between and below the forward and rear portions 56 and 58 of the structure forming the slot. The brackets for mounting the housing 14 are attached in the slot 30 as will be described hereinafter.

One mounting bracket for mounting the housing 14 with a supporting structure is shown in FIGS. 2 and 3, with the bracket generally indicated at 64. The bracket 64 is a generally U-shaped bracket having a generally U-shaped center portion 66 with a plate portion 68 on one side thereof and a semi-annular shaped portion 70 on the other side thereof. Preferably, the bracket 64 is produced by an extrusion method and has the cross-sectional form as shown in FIG. 3. The plate portion 68 of the bracket 64 is sized to slide in the slot 30 on the housing's top portion 24. A screw 72 is mounted immediately above the plate 60, extending through the portion of the bracket connecting same with the U-shaped center portion 66. The screw 72 is tightened against the slot's rear portion 68 to wedge the plate tightly in the slot 30 for securing the bracket 64 with the housing 14. The semi-annularly shaped bracket portion 70 is preferably curved in the same general direction as the T-shaped center portion of the bracket. The vehicle top structure on which the bracket 64 is designed to be mounted is a hollow tubular bar member 76 on the perimeter thereof over which the top fabric 76 is stretched. The top fabric 78 is constructed in the form of a cover for the tubular frame structure of the top and such has a draw string 112 on the interior edge portion of the top that is tightened to secure the fabric 78 in place. The U-shaped bracket 64 is securable to the tubular top member 76 by a bolt or some suitable fastener 80 with the draw string portion of the top enclosed in the confines of the U-shaped center portion 66 of the bracket, as shown in FIG. 3. In mounting the housing 14 with the top structure of this type of pair of brackets are used on opposite ends of the housing so that the housing 14 is rigidly mounted on the frame structure of the top.

Another bracket structure for mounting the housing 14 of the windshield of this inventon, is shown in FIGS. 1, 4 and 5 with the bracket indicated generally at 84. The bracket 84 is constructed to attach the housing 14 with the tops of golf carts which have a tubular frame structure or the like with a rigid or substantially rigid top covering with the bracket attaching the housing to the frame structure and upper forward portion thereof. The structure of such a top is shown in the drawings and includes a tubular member 86 on the perimeter of the structure, a rigid or substantially rigid top member 88 having a curved outer edge portion 90 disposed over the exterior of the tubular member 76. The bracket includes a plate or base portion 92 with an extended partially-annular shaped portion 94 offset as shown in FIG. 4. The bracket is secured with the housing slot 30 by fastener having a barrel-like upper portion 96 to receive a threaded member such as a screw and it has a flat flange portion 98 positioned between the base portion 92 of the bracket and the slot's inner surface 60 as shown. Preferably, a set screw 100 having a hexagonally shaped recessed end portion is threadedly engaged inside the barrel portion 96 of the fastener and tightened against the slot's inner surface 60 to wedge the bracket 84 in place in the slot 30. The bracket has a plurality of apertures in its semi-annularly shaped portion for attaching such to a supporting structure by fasteners 102 such as bolts, screws and the like.

FIG. 1 shows the housing 14 mounted on the golf cart top structure by the brackets 84 with the upper semi-annular shaped portions 94 being visible. Preferably, a pair of brackets are used to attach the housing to the golf carts top structure with the bracket 84 being on the opposite end portion of the housing 14.

Another bracket structure used to mount the housing 14 with a golf cart top structure or the like is shown in FIG. 6 with the bracket indicated generally at 106. The top structure on which the bracket 106 is designed to be used has a tubular frame supporting structure with tubular members on the perimeter thereof as indicated by the tubular member 108, and has a fabric 110 stretched over the frame and supported in place by draw strings or attaching cords in the outer edge of the fabric as indicated at 112. The brackets 106 support the housing 14 between tubular members of the top tubular frame structure in the position shown in FIG. 6. This type of top usually has the fabric portion thereof removed when the cart is placed on the vehicle to be transported on the highway from place to place in order to prevent the fabric of the top from being damaged. The bracket 106 includes an elongated portion 114 having a semi-annularly shaped outer end portion 116 and a second bracket portion 118 also with a semi-annularly shaped outer end portion 120. The bracket portion 114 and 118 are secured together by a fastener 122, such as a bolt, so the semi-annularly shaped outer end portions 116 and 120 respectively, form a generally annularly shaped clamp to engage and hold a tubular member 108 of the top structure. The first bracket member 114 is substantially elongated and extends into the slot 30 on the housing top portion 24 with the bracket member being substantially as wide as the slot. A fastener is mounted with a mid portion of the bracket's first portion, 114, through an aperture therein to rigidly mount the bracket 106 with the housing 14. The fastener includes an internally threaded barrel-like portion 124 with a flange 126 on one end thereof. The flange is disposed in the slots between the slots inner surface and the lower surface of the bracket first portion 114. A set screw threaded into the barrel portion 124 of the fastener is tightened against the slot's inner surface 60 to secure the bracket first portion 114 in rigid position in the housing 14. The pair of brackets 106 are preferably used to mount the housing 14 with the supporting structure, one bracket being attached on each end of the housing.

It is to be noted that in the event it is desired to use the windshield 10 of this invention on a golf cart or other vehicle which does not have a top structure, an auxiliary support structure can be constructed on the vehicle so that the housing 14 can be attached to such supporting structure by the brackets. With the windshield 10 of this invention mounted on a golf cart similar to which does not have a top structure, it will afford some degree of protection from wind, rain, and so forth when in use.

With the windshield 10 of this invention mounted with the top structure of the golf cart 12, as shown in FIG. 1, the sheet of flexible transparent material 16, can be retained on the roller 32 in the housing during periods when the cart is not in use or in time when it is not desired to use the windshield. When it is desired to use the windshield 10 of this invention, the handle 40 on the transparent sheet lower edge portion 38 is grasped and pulled to unroll the sheet of flexible transparent material 16 from the roller 32. The sheet is drawn to a position where its lower edge portion 38 can be secured with the fasteners 46. The roller 32 being a constant tension roller applies a constant tension to a sheet of transparent flexible material 16 to maintain such in a taut position between the edge portion attached to the cart and the housing 14. When the windshield 10 is no longer needed, it's lower edge portion 38 is removed from the fasteners 46 and the sheet of flexible material 16 is rolled onto the roller 32 where it is retained in a position shown in FIG. 4 until needed again.

In the manufacture of the windshield structure of this invention, it is obvious that same can be easily constructed to achieve the end product.

The housing and brackets therefore and handle can be easily constructed from extruded material and cut to size for easy assembly in the sheet of transparent flexible material and can be cut to size from the larger sheets or rolls with the lower edge portion thereof being attached by any suitable bonding process or heated fastening process.

In the use and operation of the windshield for golf carts of this invention, it would seem that same provides a retractable and extendable temporary windshield for golf carts for other vehicles which are not normally constructed with windshields. The windshield structure is easily mountable with several configurations of top or sun roof structures, normally found on golf carts or similar opened type vehicles. When the windshield is needed, it is simply unrolled from the roller in the housing and attached to a lower portion of the vehicle and when it is no longer needed, it is simply rerolled on the roller in the housing. The roller is spring urged to retain the sheet of transparent flexible material of the windshield in taut position when stretched for use or in the retracted position when retracted.

As will become apparent from the foregoing description of the applicant's windshield structure, relatively inexpensive and simple means have been provided to supply a windshield for a golf cart or other similar open vehicles where it is desirable to have a windshield for temporary use on an occasion. The windshield structure is economical to manufacture due to the simple construction thereof, and it is easy to use in that it remains in a rolled condition until pulled for use. The windshield structure housing is attractive in appearance and does not detract from the appearance of a golf cart even when mounted in a visible position.

While the invention has been described in conjunction with the preferred specific embodiments thereof, it will be understood that this description is intended to illustrate and not to limit the scope of the invention, which is defined by the following claims.

I claim:

1. In a vehicle having a driver's seat and a generally horizontal roof member forward of and above the normal head position of the driver thereof, a windshield comprising:
   a. a housing substantially the width of the driver's seat, said housing defines an elongated cavity having an elongated opening on one side thereof, said housing having a slotted portion therein, said housing extending approximately from one side of said driver's seat to the other;
   b. a pair of brackets, said brackets each having a first portion slidably engaged in the slotted portion of said housing and a second portion extending from the first portion and connected to said horizontal roof member, the first portion of said brackets has a fastener member rigidly securing said brackets to said housing, the second portion of said brackets has a cross sectionally semi-annular outer end portion;
   c. a roller mounted in said housing;
   d. an extendable and retractable flexible transparent sheet of material, almost as wide as said housing is long, rollably mounted on said roller; and
   e. attachment means on an outer edge portion of said sheet constructed and adapted to removably secure same when extended to a member on said vehicle in the lower portion thereof and forward of said driver's seat, thereby providing a windshield for said vehicle.

2. The windshield of claim 1, wherein:
a. said housing has an elongated box-like structure, said slotted portion being on an elongated side thereof and being opposite to said cavity opening,
b. said slotted portion has the slot thereof extending the entire length of said elongated side opening at opposite ends of said housing, and
c. said vehicle is a powered golf cart.

3. The windshield of claim 1, wherein:
a. said golf cart has a top, and
b. said transparent sheet of material is tinted to reduce glare.

4. The windshield of claim 1, wherein the second portion of said brackets has a generally cross-sectionally U-shaped center portion with one side thereof secured to said first portion and the cross-sectionally semi-annular outer end portion extending from the other side of the U-shaped portion.

5. The windshield of claim 1 wherein said roller is an elongated constant tension roller with ends thereof mounted in said housing.

6. The windshield of claim 1, wherein said attachment means has a perforated member mounted on a plurality of fasteners secured to said vehicle.

* * * * *